(12) United States Patent
Ryan et al.

(10) Patent No.: US 11,436,556 B2
(45) Date of Patent: Sep. 6, 2022

(54) METHOD AND SYSTEM FOR DELIVERY ASSIGNMENT AND ROUTING

(71) Applicant: Roadie, Inc., Atlanta, GA (US)

(72) Inventors: Kevin Ryan, San Francisco, CA (US); Daniel Zink, Atlanta, GA (US)

(73) Assignee: Roadie, Inc., Atlanta, GA (US)

( * ) Notice: Subject to any disclaimer, the term of this patent is extended or adjusted under 35 U.S.C. 154(b) by 254 days.

(21) Appl. No.: 16/263,438

(22) Filed: Jan. 31, 2019

(65) Prior Publication Data
US 2020/0250617 A1 Aug. 6, 2020

(51) Int. Cl.
*G06Q 10/08* (2012.01)
*G01C 21/34* (2006.01)
*G06Q 10/04* (2012.01)

(52) U.S. Cl.
CPC ..... *G06Q 10/08355* (2013.01); *G01C 21/343* (2013.01); *G06Q 10/047* (2013.01)

(58) Field of Classification Search
CPC ........... G06Q 10/00–30; G06Q 10/047; G06Q 10/08355; G01C 21/343
USPC ....................................................... 705/338
See application file for complete search history.

(56) References Cited

U.S. PATENT DOCUMENTS

| | | | |
|---|---|---|---|
| 9,569,745 B1 * | 2/2017 | Ananthanarayanan | G06Q 10/087 |
| 2002/0026356 A1 * | 2/2002 | Bergh | G06Q 10/10 705/14.53 |
| 2011/0231215 A1 * | 9/2011 | Santos | G06Q 10/0631 705/7.12 |
| 2013/0166395 A1 * | 6/2013 | Vassilvitskii | G06Q 30/0244 705/14.73 |
| 2016/0342677 A1 * | 11/2016 | Nuchia | G06F 16/285 |
| 2017/0286893 A1 * | 10/2017 | Clark | G06Q 10/063112 |

(Continued)

FOREIGN PATENT DOCUMENTS

| | | | |
|---|---|---|---|
| CN | 110648096 A | * | 1/2020 |
| CN | 111126799 A | * | 5/2020 |
| CN | 113516293 A | * | 10/2021 |

OTHER PUBLICATIONS

Ding, Cluster merging and splitting in hierarchical clustering algorithms, Dec. 12, 2002, IEEE, 139-146 (Year: 2002).*

(Continued)

*Primary Examiner* — Jeff Zimmerman
*Assistant Examiner* — Brian Adams Heflin
(74) *Attorney, Agent, or Firm* — Smith Gambrell & Russell LLP

(57) ABSTRACT

Embodiments of the present systems and methods may provide techniques for assigning deliveries to drivers and for routing those deliveries that that ensure delivery and encourage drivers to submit offers. For example, in an embodiment, a method for delivery routing may comprise receiving information relating to delivery drivers' offers to deliver a plurality of items to be delivered, generating hierarchical clusters of pickup locations of the plurality of items to be delivered, for each generated hierarchical cluster, generating a delivery route of a vehicle to deliver the items to be delivered for that cluster, generating new delivery routes from the generated delivery routes by breaking the generated delivery routes based on the delivery drivers' offers to deliver a plurality of items, and matching delivery drivers with deliveries of items to be delivered based on a plurality of criteria.

3 Claims, 6 Drawing Sheets

(56) References Cited

U.S. PATENT DOCUMENTS

| | | | |
|---|---|---|---|
| 2019/0020578 A1* | 1/2019 | Beckmann | H04L 45/42 |
| 2019/0080275 A1* | 3/2019 | Brownell | G06Q 10/083 |
| 2019/0205813 A1* | 7/2019 | Sharma | G06F 16/951 |

OTHER PUBLICATIONS

Wang, Ship Route Extraction and Clustering Analysis Based on Automatic Identification System Data, Nov. 5, 2017, IEEE, 33-38 (Year: 2017).*

"A Scalable Last-Mile Delivery Service: From Simulation to Scaled Experiment," by Logan Beaver, Behadad Chalaki, Heeseung Bang, Andreas A Malikopoulos, Sep. 2021 (Year: 2021).*

* cited by examiner

METHOD AND SYSTEM FOR DELIVERY ASSIGNMENT AND ROUTING

BACKGROUND

The present invention relates to techniques for assigning deliveries to drivers and for routing those deliveries.

Dispatch-based delivery or passenger systems typically select one driver, or a small number of drivers, to offer a delivery or ride, and the driver or drivers may accept or refuse that delivery or ride. Bid-based delivery or passenger systems typically notify all, or a significant subset of, drivers, about all or many of the deliveries or rides that are available, and then accept offers from the drivers for those deliveries or rides for which each driver desired to make an offer. The bid-based delivery or passenger system must then determine which offers to accepts. Conventional systems may be complicated and may not accept offers in ways that ensure delivery or encourage drivers to submit offers.

Accordingly, a need arises for techniques for assigning deliveries to drivers and for routing those deliveries that ensure delivery and encourage drivers to submit offers.

SUMMARY

Embodiments of the present systems and methods may provide techniques for assigning deliveries to drivers and for routing those deliveries that ensure delivery and encourage drivers to submit offers.

For example, in an embodiment, a method for delivery routing may comprise receiving information relating to delivery drivers' offers to deliver a plurality of items to be delivered, generating hierarchical clusters of pickup locations of the plurality of items to be delivered, for each generated hierarchical cluster, generating a delivery route of a vehicle to deliver the items to be delivered for that cluster, generating new delivery routes from the generated delivery routes by breaking the generated delivery routes based on the delivery drivers' offers to deliver a plurality of items, and matching delivery drivers with deliveries of items to be delivered based on a plurality of criteria.

In embodiments, the information relating to delivery drivers' offers may comprise current driver activity. Generating hierarchical clusters of pickup locations may comprise performing agglomerative hierarchical clustering on pickup locations, merging clusters based on a distance between clusters, wherein a distance between two clusters is a largest distance between any pickup locations in each of the two clusters. Generating a delivery route may comprise defining as a route a plurality of deliveries to be performed by one delivery driver, wherein an origin of the deliveries is a medoid of the cluster, and the route is defined based on a capacity of a vehicle, a size of a shipment, and a time window. Generating new delivery routes may comprise breaking the generated delivery routes based on the delivery drivers' offers to deliver a plurality of items so that each new delivery route has at least one driver who has submitted an offer on all deliveries in the route. Matching delivery drivers with deliveries of items may be based on ensuring that as many deliveries as possible are completed and to reward the drivers based on predefined criteria. Generating new delivery routes may comprise ensuring that as many deliveries as possible are completed by generating a bipartition having a first side including all new delivery routes with at least one published shipment request, and a second side including all delivery drivers who have submitted offers on at least one new delivery route and matching delivery drivers with new delivery routes using max weight bipartite matching on a graph in which edges are defined between a delivery driver and new delivery route if the delivery driver has submitted an offer on all shipment requests in the new delivery route, wherein the edges are weighted based on a number of shipment requests on the new delivery route. Generating new delivery routes may comprise rewarding the drivers by generating a bipartition having a first side including all new delivery routes matched in the shipment request maximization, and a second side including all drivers who have submitted offers on at least one new delivery route and matching delivery drivers with new delivery routes using max cardinality bipartite matching on a graph in which edges are defined between a delivery driver and new delivery route if the delivery driver has submitted an offer on all shipment requests in the new delivery route, wherein the edges are weighted based on a randomized base score determined by the number of offers the driver has made in the past week, with offers which were not accepted counted double.

In an embodiment, a system for delivery routing may comprise a processor, memory accessible by the processor, and computer program instructions stored in the memory and executable by the processor to perform receiving information relating to delivery drivers' offers to deliver a plurality of items to be delivered, generating hierarchical clusters of pickup locations of the plurality of items to be delivered, for each generated hierarchical cluster, generating a delivery route of a vehicle to deliver the items to be delivered for that cluster, generating new delivery routes from the generated delivery routes by breaking the generated delivery routes based on the delivery drivers' offers to deliver a plurality of items, and matching delivery drivers with deliveries of items to be delivered based on a plurality of criteria.

In an embodiment, a computer program product for delivery routing may comprise a non-transitory computer readable storage having program instructions embodied therewith, the program instructions executable by a computer, to cause the computer to perform a method comprising receiving information relating to delivery drivers' offers to deliver a plurality of items to be delivered, generating hierarchical clusters of pickup locations of the plurality of items to be delivered, for each generated hierarchical cluster, generating a delivery route of a vehicle to deliver the items to be delivered for that cluster, generating new delivery routes from the generated delivery routes by breaking the generated delivery routes based on the delivery drivers' offers to deliver a plurality of items, and matching delivery drivers with deliveries of items to be delivered based on a plurality of criteria.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques for assigning deliveries to drivers and for routing those deliveries that ensure delivery and encourage drivers to submit offers.

Figure 1:
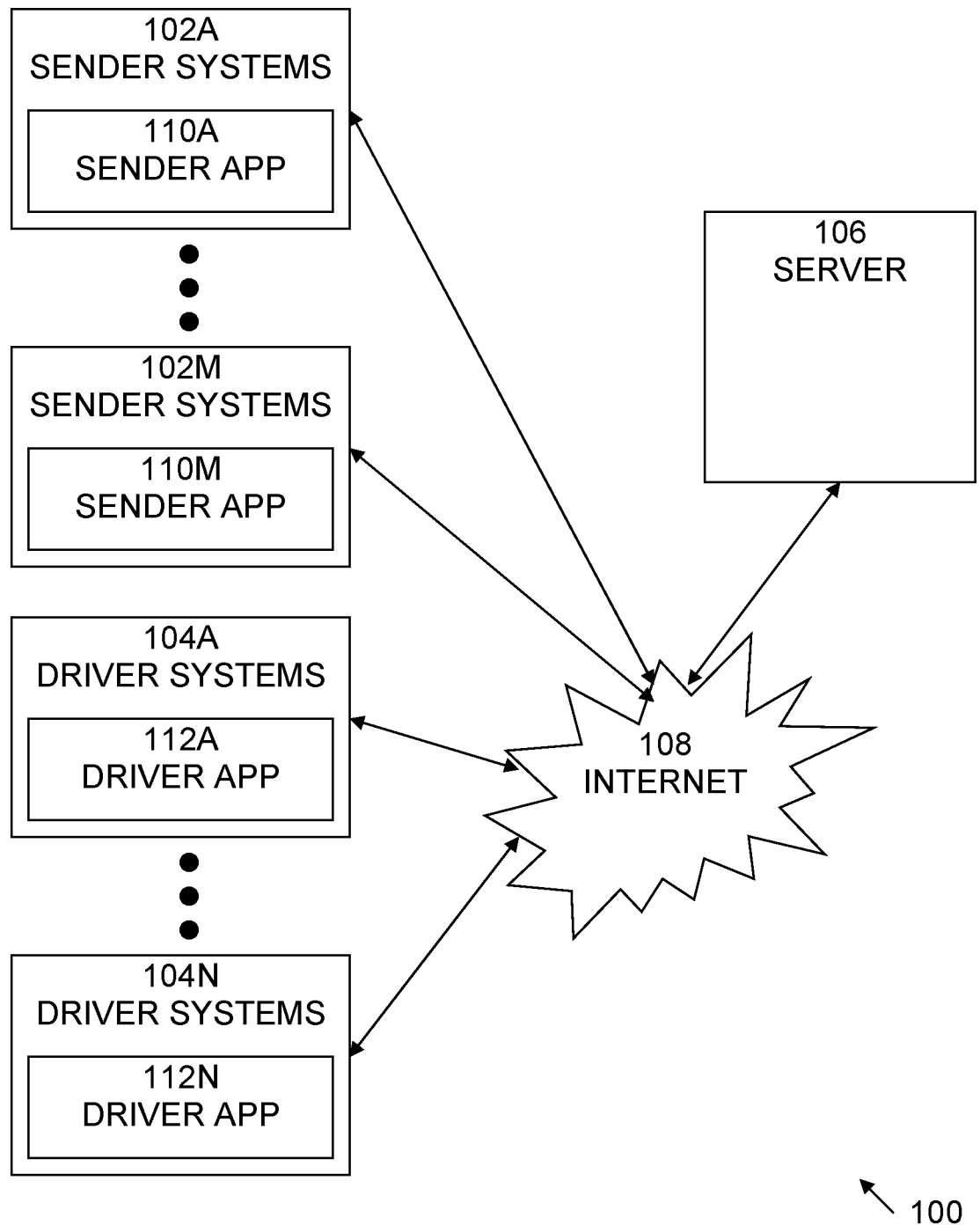
FIG. 1 illustrates an exemplary system in which the embodiments of the present systems and methods may be implemented.

An exemplary system 100 in which embodiments of the present systems and methods may be implemented is shown in FIG. 1. In this example, system 100 may include a plurality of sender systems 102A-M, driver systems 104A-N, server 106 and a communications networks, such as Internet 108. Sender systems 102A-M typically include a mobile device, such as a smartphone or tablet, but may include any computing device capable of running software programs, and may include general purpose computing devices, such as a personal computer, laptop, smartphone, tablet computer, etc., and may include special-purpose computing devices, such as embedded processors, systems on a chip, etc., that may be include in standard or proprietary devices. Sender systems 102A-M may include a sender app 110A-M, which may perform the sender functions and method steps of embodiments of the present systems and methods, as described below. Typically, a sender is a user who needs a shipment sent from a pickup location to a delivery location and utilizes a sender system, such as 102A, and a sender app, such as 110A, in order to obtain such delivery services. Sender app 110A-M may include functionality such as the shipment sender price—the price paid by the sender to send the individual shipment in question, etc.

Driver systems 104A-N typically include a mobile device, such as a smartphone or tablet, but may include any computing device capable of running software programs, and may include general purpose computing devices, such as a personal computer, laptop, smartphone, tablet computer, etc., and may include special-purpose computing devices, such as embedded processors, systems on a chip, etc., that may be include in standard or proprietary devices. Driver systems 104A-N may include a driver app 112A-N, which may perform the driver functions and method steps of embodiments of the present systems and methods, as described below. Typically, a driver is a user operating a vehicle who drives a delivery from a pickup location to a delivery location and utilizes a driver system, such as 104A, and a driver app, such as 112A, in order to obtain such delivery services. In embodiments, the present systems and methods may organize functionality in terms a shipment having a single pickup location and a single delivery location. Driver app 112A-N may include functionality such as push notifications that may be sent to drivers announcing a potential shipment on which they may bid, an in app map of potential shipments on which drivers may bid, the shipment driver price—the price paid to the driver for delivering the individual shipment in question, driver offers—offers submitted by the driver to deliver the shipment as posted for the shipment driver price, etc.

It is to be noted that, although in the example shown in FIG. 1, sender app 110A-M and driver app 112A-N are shown as separate apps, sender app 110A-M and driver app 112A-N may be implemented as different functions of the same app or similar apps, or in different apps, as shown.

Server 106 typically includes a plurality of server computer systems, but may include any computing device capable of running software programs, and may include general purpose computing devices, such as a personal computer, laptop, smartphone, tablet computer, etc., and may include special-purpose computing devices, such as embedded processors, systems on a chip, etc., that may be include in standard or proprietary devices. Server 106 may perform the communications, routing, scheduling, etc., functions, and method steps of embodiments of the present systems and methods, as described below. The network may include any public or proprietary communications networks, such as a telecommunications carrier network, LAN, or WAN, including, but not limited to the Internet 108.

Figure 2:
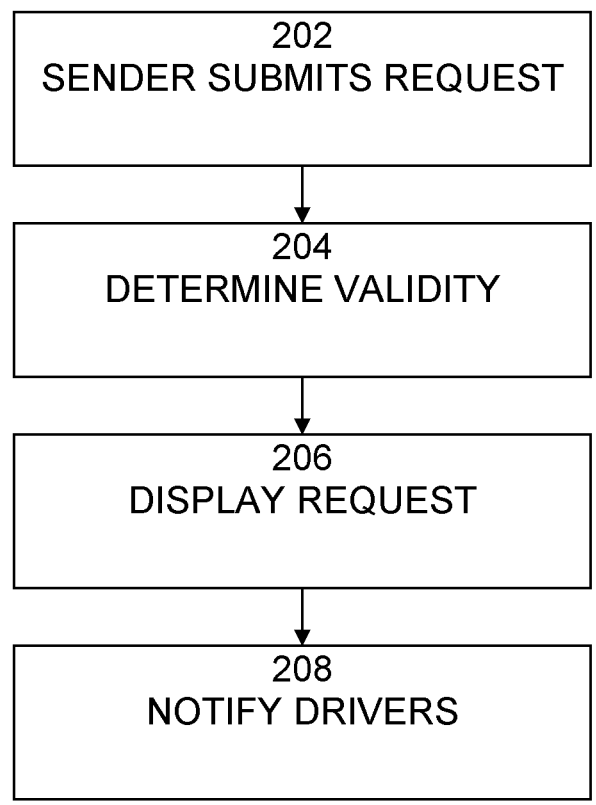
FIG. 2 is an exemplary flow diagram of a process, which may implement embodiments of the present methods, and which may be implemented in embodiments of the present systems.

An exemplary flow diagram of a process 200 of operation of system 100 is shown in FIG. 2. It is best viewed in conjunction with FIG. 1. Process 200 begins with 202, in which a sender, using a sender system, such as 102A, and a sender app, such as 110A, submits a request for a shipment. For example, a sender may use sender app 110A to send a shipment request via Internet 108 to server 106. At 204, server 106 may determine the validity of the shipment request, for example, based on the pickup location, delivery location, delivery schedule, etc. At 206, for valid shipment requests, the shipment request may be displayed on, for example, an available shipment map in driver apps 112A-N. At 208, for valid shipment requests, drivers may be notified of the available shipment request using a push notification, for example, via driver apps 112A-N, text messages, etc.

Figure 3:
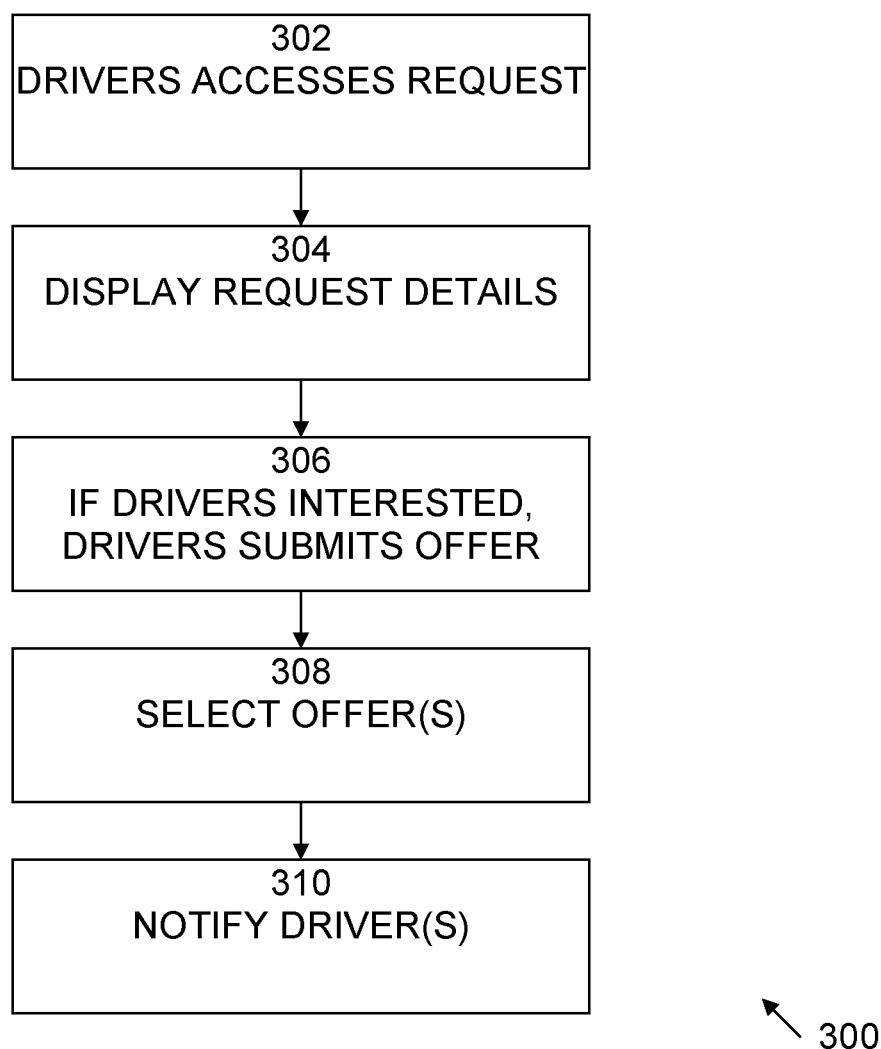
FIG. 3 is an exemplary flow diagram of a process, which may implement an adversarial framework according to embodiments of the present methods, and which may be implemented in embodiments of the present systems.

An exemplary flow diagram of a process 300 of operation of system 100 is shown in FIG. 3. It is best viewed in conjunction with FIG. 1. Process 300 begins with 302, in which drivers, having received knowledge of an available shipment, either from an available shipment map displayed in driver apps 112A-N or a received notifications of the available shipment request, may access the available shipment request, using, for example, driver apps 112A-N. For example, drivers may access the available shipment request by clicking on, touching, etc., an indication of the available shipment request in the available shipment map displayed in driver apps 112A-N or the received notification. At 304, in response to drivers accessing the available shipment request, details of the request may be displayed, for example, in driver apps 112A-N. At 306, those drivers who are interested in the available shipment request may submit an offer to perform the delivery indicated by the request, which may be transmitted to server 106. At 308, server 106 may select an offer from a driver to accept. At 310, those drivers whose offers are rejected are notified of the rejection and the driver whose offer is accepted is notified of the acceptance. The drivers whose offer is accepted may then complete the shipment by picking up the item(s) to be shipped and delivering the item(s) to the delivery location. If no offers are accepted, the drivers whose offers are rejected may be allowed to submit new bids for the shipment request.

Figure 4:
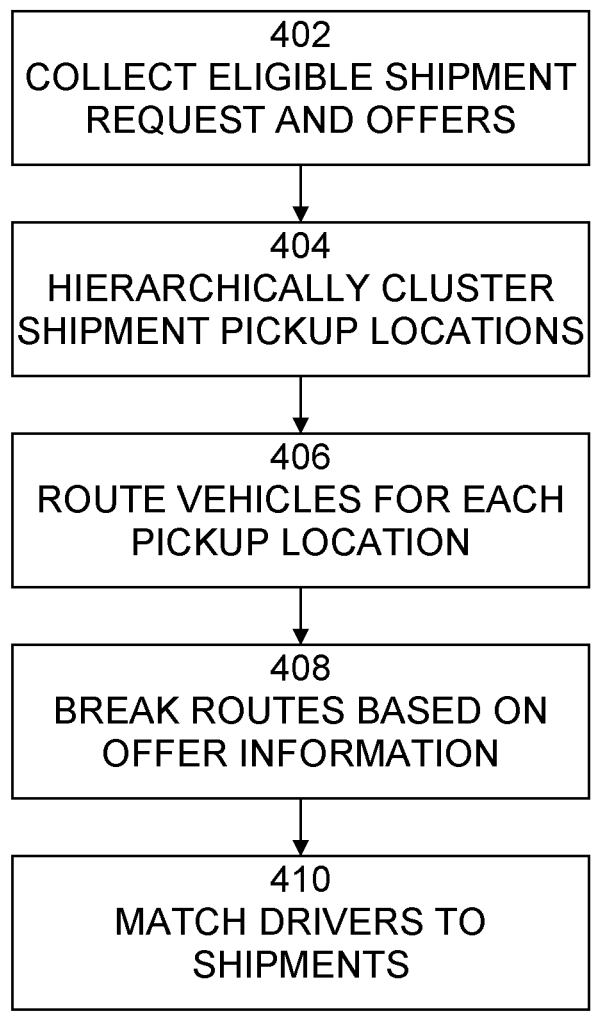
FIG. 4 is an exemplary flow diagram of a process, which may implement an adversarial framework according to embodiments of the present methods, and which may be implemented in embodiments of the present systems.
Figure 4:

An exemplary flow diagram of a process 400 of operation of system 100 is shown in FIG. 4. It is best viewed in conjunction with FIG. 1. Process 400 begins with 402, in which eligible shipment request and driver offers are collected at server 106. Eligible shipment requests may be determined, for example based on whether the shipment request is in a "published" (available and notified to drivers) state or whether the shipment request has been accepted, and based on a creation time of the shipment request, in order to give drivers time to submit offers on all shipment requests in a route. Eligible driver offers may be determined based on factors such as current driver activity. For example, a driver offer may be eligible if the driver does not have an active delivery in a stage "on the way to delivery" or later, the driver does not have a conflicting delivery in the near future, the driver has a rating high enough and the driver has all certifications needed to complete the delivery.

At 404, the pickup locations of the collected eligible shipment requests may be hierarchically clustered. For example, an agglomerative hierarchical clustering algorithm may be run on the pickup locations for eligible shipment requests. The metric used for merging clusters may be the distance between clusters. The distance between cluster A and cluster B may be defined as the largest distance between any given pickup location in A and any given pickup location in B. Clusters may be merged greedily, with ties broken by preference for larger resulting cluster size. If both conditions result in a tie, the ties may be broken randomly.

At 406, vehicles may be routed for each pickup location. For example, for each cluster of pickup locations, a capacitated vehicle routing problem (taking capacity of each vehicle into account) with time windows may be solved. The routing may not define the precise route to be taken by each driver, but rather may define which deliveries are to be performed by one driver. The depot may be considered to be located at the medoid of each cluster. The shipment request delivery destinations may be mapped to delivery destinations. Time windows for each delivery may be defined from zero minutes to the number of minutes until the shipment request delivery deadline. If the window is not feasible when driving directly to the delivery destination, it is extended to allow for direct delivery. Stop time may be set to default values, such as the time at the depot may be 40 minutes, and the time spent at each stop may be 10 minutes. The number of vehicles allowed may be equal to the number of delivery destinations. For example, the capacity of each vehicle is set at a default value, such as 60 units. Shipment sizes (small, medium, large, extra_large, huge) may be mapped to a different number of units depending on the preferences of the sender. In embodiments, the objective function that may be minimized is the total drive time of all vehicles. Delivery locations which correspond to shipment requests in an "accepted" state that are assigned to the same driver may be forced to be in the same route with the use of a large penalty in the objective function if the deliveries are in different routes. This formulation may be solved using a heuristic, not exact solution, for example, using the OR-Tools package that may be found at developers.google.com/optimization.

At 408, the determined vehicle routes may be broken based on driver offer information. For example, due to the driver offer submission process, there may be routes for which no drivers have offered to perform deliveries for the entire route. Thus, after routes are computed they may be broken up until into route pieces to form new routes such that all remaining routes have at least one driver who has submitted an offer on all deliveries in the route. The objective function in this procedure may be the product of the lengths of the routes and the goal may be to maximize this objective function. Ties may be broken by selecting the solution with the longest route piece.

For the remaining routes for which more than one driver has offered to make all deliveries on that route, at 410, drivers may be matched to shipment routes. For example, after routes are computed and broken for each cluster, two bipartite matchings may be solved over all shipment requests and driver offers. The goal of the matching process may be to ensure that as many deliveries as possible are completed and to reward the best drivers (based on certain criteria, such as drivers with the best delivery performance, drivers who are already close to delivery destinations, and drivers who frequently submit offers) with deliveries to perform.

Figure 5:
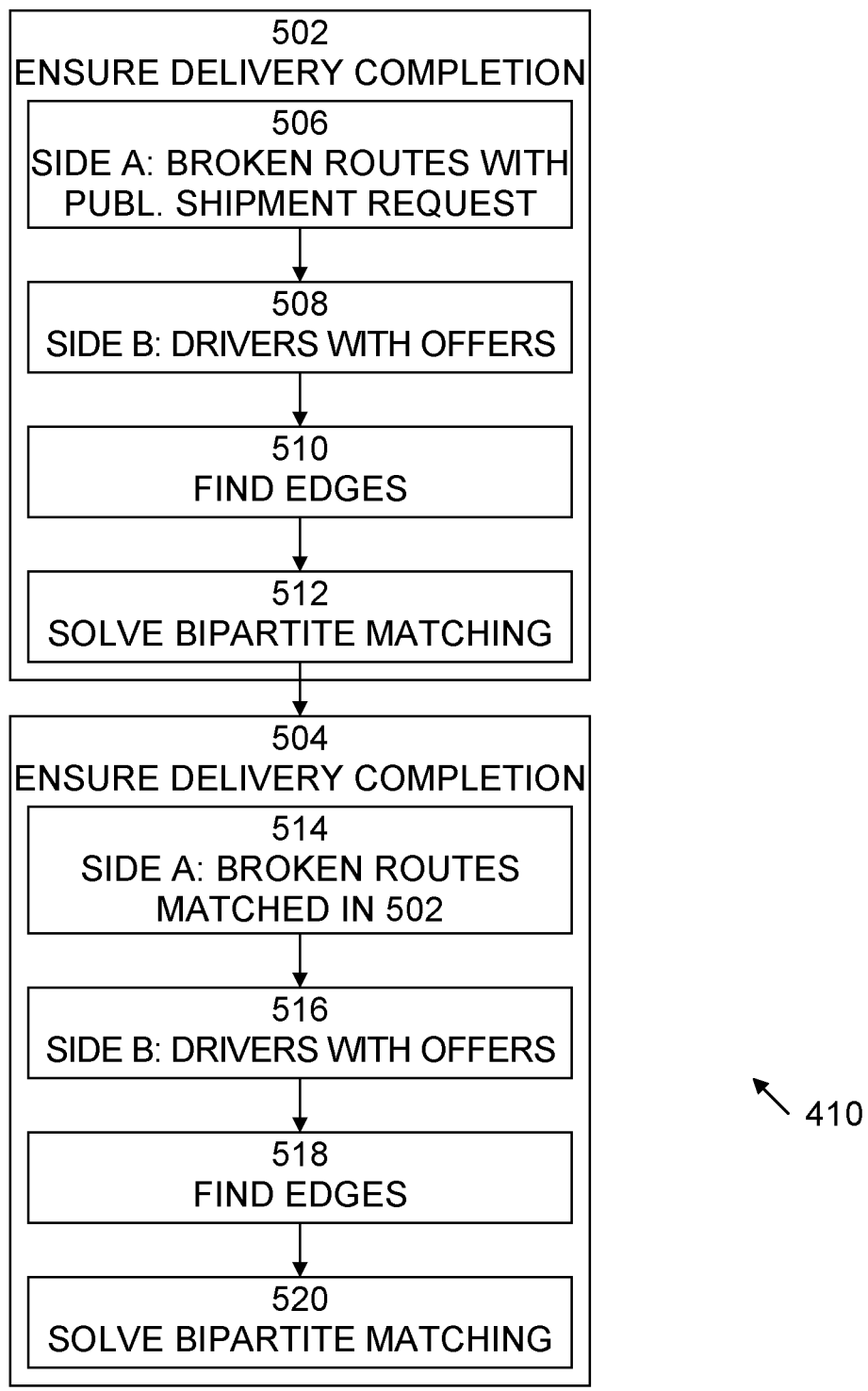
FIG. 5 is an exemplary flow diagram of a process, which may implement an adversarial framework according to embodiments of the present methods, and which may be implemented in embodiments of the present systems.

The matching process 410 is shown in more detail in FIG. 5. As shown in FIG. 5, to accomplish the goals of the matching process, the data may be partitioned based on maximization of shipment request delivery 502 to ensure that as many deliveries as possible are completed, and finding of the best driver 504 based on the criteria. To maximize shipment request delivery completion 502, at 506, Side A of the bipartition may correspond to all broken routes with at least one published shipment request, and at 508, Side B of the bipartition may correspond to all drivers who have submitted offers on at least one broken route. At 510, edges may be found. Edges may exist between a driver and route if the driver has submitted an offer on all shipment requests in the route. Edge weight may be equal to the number of shipment requests on the route. At 512, a max weight bipartite matching may be solved on the graph. The goal of this matching may be to get as many shipment request matched as possible. This solution may be used in the subsequent driver matching.

To find the best drivers 504 for the remaining routes, at 512 Side A of the bipartition may corresponds to all broken routes matched in the shipment request maximization 502, and at 516, Side B of the bipartition may correspond to all drivers who have bid on at least one broken route. At 518, edges may be found. Edges may exist between a driver and route if the driver has bid on all shipment requests in the route. Edge weight may be computed using a randomized base score determined by the number of offers the driver has made in the past week, with offers which were not accepted counted double. Thus, drivers who submit offers more frequently have a higher chance of being selected. Weights may be divided by the greater of the driver distance (in kilometers) to the shipment request pickup location and five, with the selected value squared. Thus, closer drivers are weighted more highly. Weights may be multiplied by a driver rating based score taking values between 0 and 2, for example, based on, driver delivery performance. At 520, a max weight, max cardinality bipartite matching may be solved on the graph. The edges in the optimal solution may determine which bids are accepted for the gigs in question.

Figure 6:
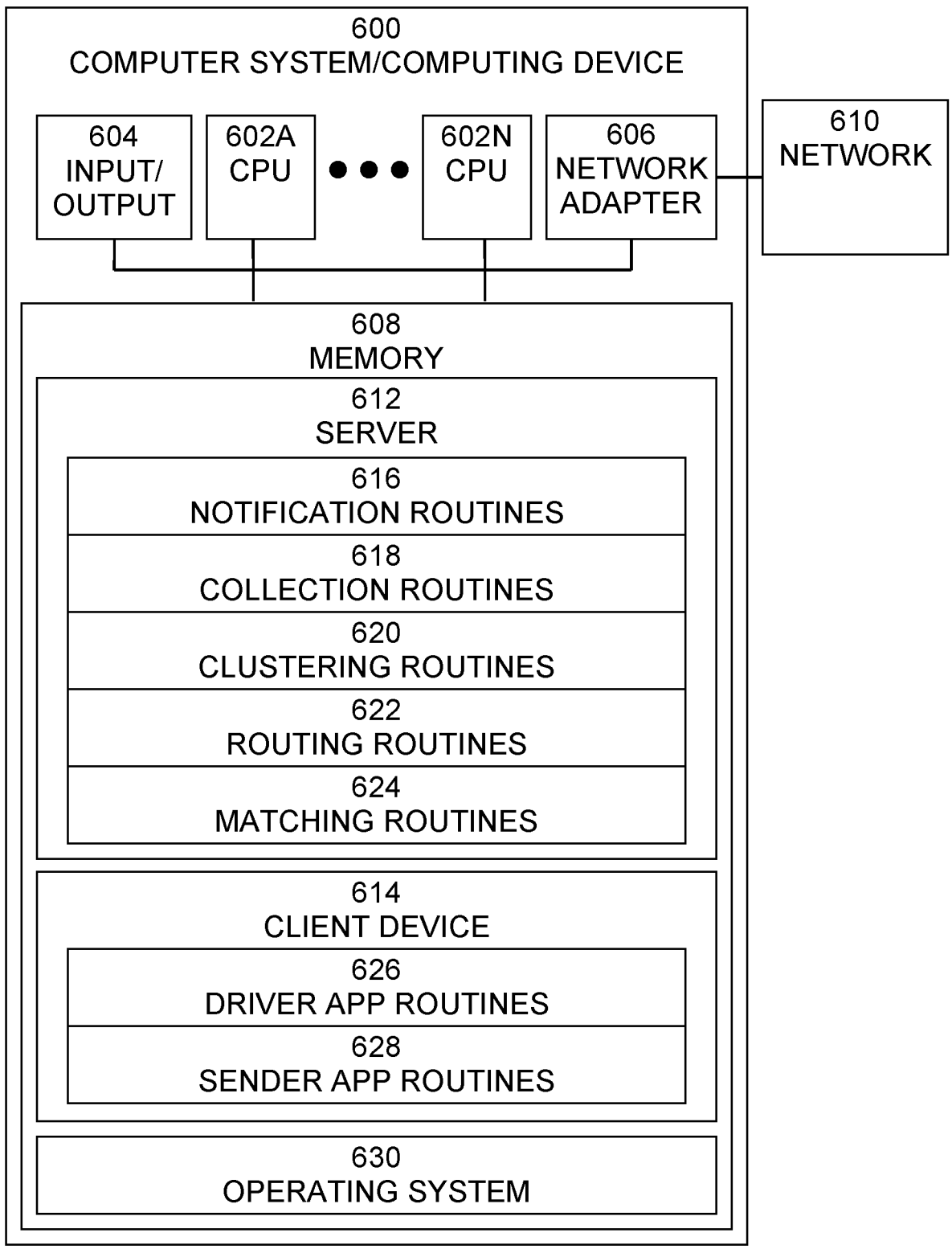
FIG. 6 is an exemplary block diagram of a computer system in which processes involved in the embodiments described herein may be implemented.

An exemplary block diagram of a computer system/computing device 600, in which processes involved in the embodiments described herein may be implemented, is shown in FIG. 6. Computer system/computing device 600 may be implemented using one or more programmed general-purpose computer systems, such as embedded processors, systems on a chip, personal computers, workstations, server systems, and minicomputers or mainframe computers, mobile devices, such as smartphones or tablets, or in distributed, networked computing environments. Computer system/computing device 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor or an ARM® processor. FIG. 6 illustrates an embodiment in which computer system/computing device 600 is implemented as a single multi-processor computer system/computing device, in which multiple processors 602A-602N share system resources, such as memory 608, input/output circuitry 604, and network adapter 606. However, the present communications systems and methods also include embodiments in which computer system/computing device 600 is implemented as a plurality of networked computer systems, which may be single-processor computer system/computing devices, multi-processor computer system/computing devices, or a mix thereof.

Input/output circuitry 604 provides the capability to input data to, or output data from, computer system/computing device 600. For example, input/output circuitry may include input devices, such as keyboards, mice, touchpads, trackballs, scanners, analog to digital converters, etc., output devices, such as video adapters, monitors, printers, biometric information acquisition devices, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system/computing device 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system/computing device 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 6, while for compactness memory 608 is shown as including memory contents for a server 612 and memory contents for a client device 614, such as a driver system or a sender system, typically computer system/computing device 600 only includes one such memory contents. In this example, server 612 may include notification routines 616, collection routines 618, clustering routines 620, routing routines 622, matching routines 624, and operating system 630. Likewise, in this example, client device 614 may include driver app routines 626 and sender app routines 628. Notification routines 616 may include software routines to send notifications to drivers via a driver app map, push notifications, etc., as described above. Collection routines 618 may include software routines to collect eligible shipment request and driver offers at server 106, as described above. Clustering routines 620 may include software routines to hierarchically cluster the collected eligible shipment requests, as described above. Routing routines 622 may include software routines to route vehicles for each pickup location and to break the determined vehicle routes, as described above. Matching routines 624 may include software routines to match remaining routes with drivers, as described above. In this example, client device 614 may include driver app routines 626 and sender app routines 628. Driver app routines 626 may include software routines to provide push notifications, an in app map of potential shipments, etc., as described above. Sender app 628 may include software routines to perform the sender functions, as described above. Operating system 630 may provide overall system functionality.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for delivery routing, the method comprising:
receiving information, from computing devices associated with delivery drivers, relating to delivery drivers' offers to deliver a plurality of items to be delivered, wherein the delivery drivers' offers are received in response to notifications including information relating to the items to be delivered and a price to be paid for delivering each item to be delivered;
generating hierarchical clusters of pickup locations of the plurality of items to be delivered;
for each generated hierarchical cluster, generating a delivery route of a vehicle to deliver the items to be delivered for that cluster, wherein generating hierarchical clusters of pickup locations comprises performing agglomerative hierarchical clustering on pickup locations, merging clusters based on a distance between clusters, wherein a distance between two clusters is a largest real distance between any pickup locations in each of the two clusters;

generating new delivery routes from the generated delivery routes by breaking the generated delivery routes based on the delivery drivers' offers to deliver a plurality of items so that each new delivery route has at least one driver who has submitted an offer on all deliveries in the new delivery route; and matching delivery drivers with deliveries of items to be delivered based on ensuring that as many deliveries as possible are completed and to reward the drivers based on predefined criteria, wherein ensuring that as many deliveries as possible are completed comprises:

generating a first bipartition having
a first side including all new delivery routes with at least one published shipment request, and
a second side including all delivery drivers who have submitted offers on at least one new delivery route; and matching delivery drivers with new delivery routes using max weight bipartite matching on the first bipartition in which edges are defined between delivery drivers who have submitted an offer on at least one new delivery route and new delivery routes, wherein the edges are weighted based on a number of shipment requests on the new delivery route wherein rewarding drivers based on predefined criteria comprises:

generating a second bipartition having a first side and a second side,
wherein
the first side includes all new delivery routes matched in the first bipartition including all new delivery routes with at least one published shipment request; and
the second side includes all drivers who have submitted offers on at least one new delivery route; and matching delivery drivers with new delivery routes using max cardinality bipartite matching on the second bipartition in which edges are defined between a delivery driver who has submitted an offer on at least one new delivery route and a new delivery route, wherein the edges are weighted based on a randomized base score determined by a number of offers the driver has made in the past week, wherein offers the driver has made in the past week that were not accepted are counted double; and communicating, to the computing devices associated with the delivery drivers, the new delivery routes to which the delivery drivers have been matched.

2. A system for delivery routing, the system comprising a processor, memory accessible by the processor, and computer program instructions stored in the memory and executable by the processor to perform:

receiving information, from computing devices associated with delivery drivers, relating to delivery drivers' offers to deliver a plurality of items to be delivered, wherein the delivery drivers' offers are received in response to notifications including information relating to the items to be delivered and a price to be paid for delivering each item to be delivered;

generating hierarchical clusters of pickup locations of the plurality of items to be delivered;

for each generated hierarchical cluster, generating a delivery route of a vehicle to deliver the items to be delivered for that cluster, wherein generating hierarchical clusters of pickup locations comprises performing agglomerative hierarchical clustering on pickup locations, merging clusters based on a distance between clusters, wherein a distance between two clusters is a largest real distance between any pickup locations in each of the two clusters;

generating new delivery routes from the generated delivery routes by breaking the generated delivery routes based on the delivery drivers' offers to deliver a plurality of items so that each new delivery route has at least one driver who has submitted an offer on all deliveries in the new delivery route; and matching delivery drivers with deliveries of items to be delivered based on ensuring that as many deliveries as possible are completed and to reward the drivers based on predefined criteria, wherein ensuring that as many deliveries as possible are completed comprises:

generating a first bipartition having
a first side including all new delivery routes with at least one published shipment request, and
a second side including all delivery drivers who have submitted offers on at least one new delivery route; and matching delivery drivers with new delivery routes using max weight bipartite matching on the first bipartition in which edges are defined between delivery drivers who have submitted an offer on at least one new delivery route and new delivery routes, wherein the edges are weighted based on a number of shipment requests on the new delivery route wherein rewarding drivers based on predefined criteria comprises:

generating a second bipartition having a first side and a second side,
wherein
the first side includes all new delivery routes matched in the first bipartition including all new delivery routes with at least one published shipment request; and
the second side includes all drivers who have submitted offers on at least one new delivery route; and matching delivery drivers with new delivery routes using max cardinality bipartite matching on the second bipartition in which edges are defined between a delivery driver who has submitted an offer on at least one new delivery route and a new delivery route, wherein the edges are weighted based on a randomized base score determined by a number of offers the driver has made in the past week, wherein offers the driver has made in the past week that were not accepted are counted double; and communicating, to the computing devices associated with the delivery drivers, the new delivery routes to which the delivery drivers have been matched.

3. A computer program product for delivery routing, the computer program product comprising a non-transitory computer readable storage having program instructions embodied therewith, the program instructions executable by a computer, to cause the computer to perform a method comprising:

receiving information, from computing devices associated with delivery drivers, relating to delivery drivers' offers to deliver a plurality of items to be delivered, wherein the delivery drivers' offers are received in response to notifications including information relating to the items to be delivered and a price to be paid for delivering each item to be delivered;

generating hierarchical clusters of pickup locations of the plurality of items to be delivered;

for each generated hierarchical cluster, generating a delivery route of a vehicle to deliver the items to be delivered for that cluster, wherein generating hierarchical clusters of pickup locations comprises performing agglomerative hierarchical clustering on pickup locations, merging clusters based on a distance between clusters, wherein a distance between two clusters is a largest real distance between any pickup locations in each of the two clusters;

generating new delivery routes from the generated delivery routes by breaking the generated delivery routes based on the delivery drivers' offers to deliver a plurality of items so that each new delivery route has at least one driver who has submitted an offer on all deliveries in the new delivery route; and matching delivery drivers with deliveries of items to be delivered based on ensuring that as many deliveries as possible are completed and to reward the drivers based on predefined criteria, wherein ensuring that as many deliveries as possible are completed comprises:
generating a first bipartition having
a first side including all new delivery routes with at least one published shipment request, and
a second side including all delivery drivers who have submitted offers on at least one new delivery route; and
matching delivery drivers with new delivery routes using max weight bipartite matching on the first bipartition in which edges are defined between delivery drivers who have submitted an offer on at least one new delivery route and new delivery routes, wherein the edges are weighted based on a number of shipment requests on the new delivery route wherein rewarding drivers based on predefined criteria comprises:
generating a second bipartition having a first side and a second side,
wherein
the first side includes all new delivery routes matched in the first bipartition including all new delivery routes with at least one published shipment request; and
the second side includes all drivers who have submitted offers on at least one new delivery route; and
matching delivery drivers with new delivery routes using max cardinality bipartite matching on the second bipartition in which edges are defined between a delivery driver who has submitted an offer on at least one new delivery route and a new delivery route, wherein the edges are weighted based on a randomized base score determined by a number of offers the driver has made in the past week, wherein offers the driver has made in the past week that were not accepted are counted double; and communicating, to the computing devices associated with the delivery drivers, the new delivery routes to which the delivery drivers have been matched.

* * * * *